United States Patent

Goldstone

[15] 3,680,105
[45] July 25, 1972

[54] PULSE COMPRESSION RADAR SYSTEM

[72] Inventor: Bertram J. Goldstone, Lexington, Mass.

[73] Assignee: Raytheon Company, Lexington, Mass.

[22] Filed: Oct. 5, 1970

[21] Appl. No.: 77,768

[52] U.S. Cl. .................................343/17.2 PC, 343/5 DP
[51] Int. Cl. ...........................................G01s 9/02
[58] Field of Search.........................343/17.2 PC, 5 DP

[56] References Cited

UNITED STATES PATENTS

| | | | |
|---|---|---|---|
| 3,165,741 | 1/1965 | Thor | 343/17.2 PC |
| 3,617,719 | 11/1971 | Wong et al. | 343/5 DP |
| 3,610,901 | 10/1971 | Lynch | 343/5 DP |
| 3,517,173 | 6/1970 | Gilmartin, Jr. et al. | 340/15.5 R |

Primary Examiner—Malcolm F. Hubler
Attorney—Philip J. McFarland and Joseph D. Pannone

[57] ABSTRACT

A pulse compression radar system wherein a coding signal indicative of the modulation to be impressed on a transmitted signal is read out of a read only memory and converted to: (a) an analog modulation signal impressed on a radio frequency carrier; and (b) the complex conjugate of the discrete Fourier transform of the coding signal stored in a memory. Each echo signal resulting from illumination of a different target by the modulated transmitted signal is converted to a corresponding digital form indicative of the modulation on each such echo signal, transformed in a discrete Fourier transform and correlated with the stored complex conjugate of the coding signal for the transmitted signal. The resulting correlation signal is weighted and then converted back to a time varying signal in an inverse discrete Fourier transform for utilization.

4 Claims, 3 Drawing Figures

INVENTOR
BERTRAM J. GOLDSTONE

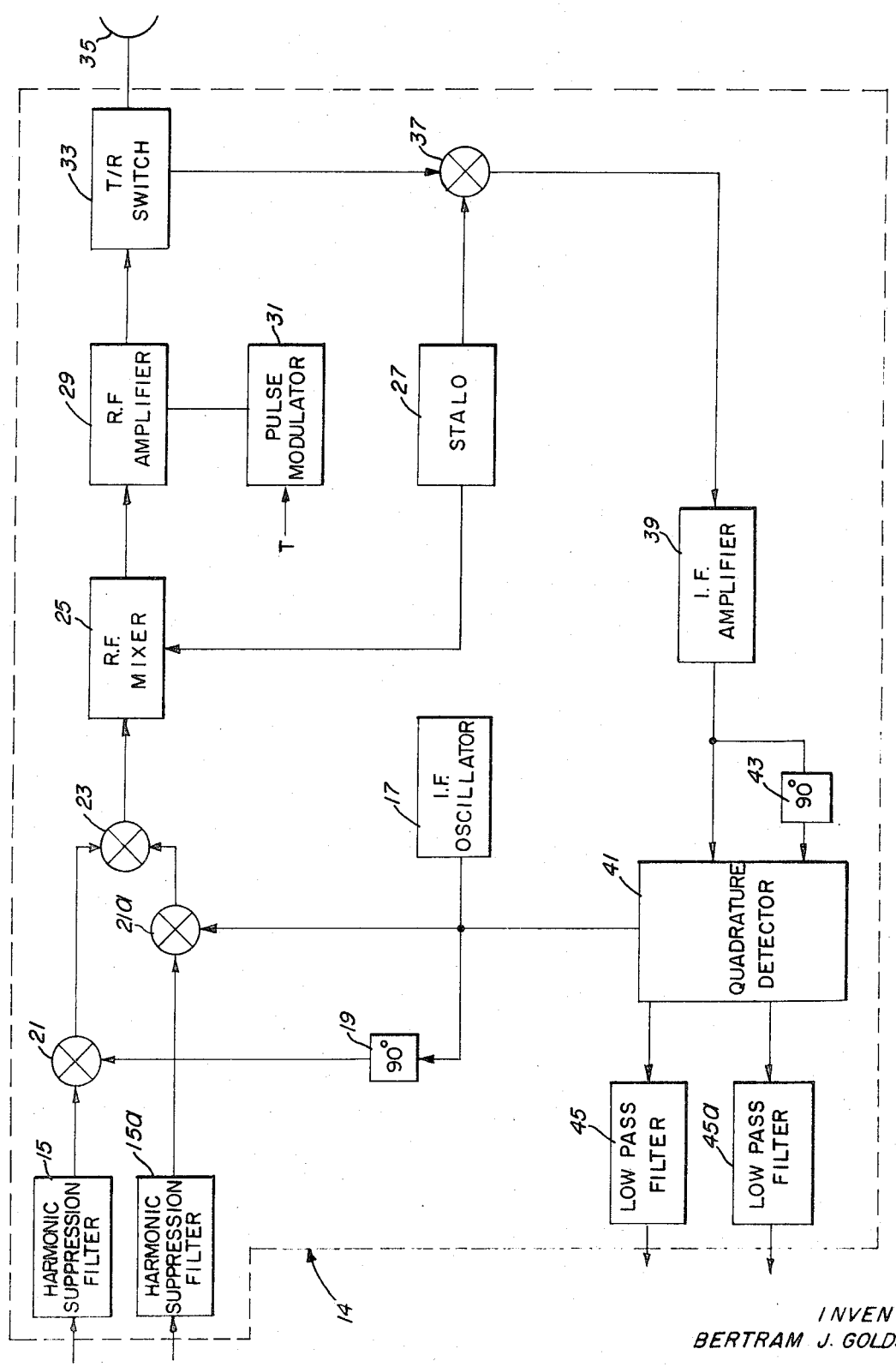

INVENTOR
BERTRAM J. GOLDSTONE

PULSE COMPRESSION RADAR SYSTEM

BACKGROUND OF THE INVENTION

This invention pertains generally to real time information processing systems for radar data and particularly to pulse compression systems of such type.

It is known in the art that echo signals resulting from relatively long coded pulses of radio frequency energy transmitted from a radar may be compressed into relatively short pulses by means of matched filtering techniques. Such processing results in correlation of each received signal with the transmitted signal to derive compressed pulses, usually accompanied by spurious responses commonly referred to as time or range sidelobes.

The relatively long coded pulses required for transmission may be generated in many known ways. For example, because such a coded pulse may be represented either as a frequency response or a time response of a coding filter, it is known to use either a frequency dispersive network that, in response to an applied impulse, distorts the phase between the elemental frequencies in such impulse, to produce a coded modulation signal, or to modulate a carrier directly with a time-varying modulation signal. In either case, a receiving filter whose response is the complex conjugate of the spectrum of the transmitted signal is needed to attain the desired pulse compression.

Unfortunately, if analog techniques are used to produce a coded pulse for transmission and to provide the required matched filtering for received signals, it becomes difficult to avoid errors due to instability of the elements used, ambient temperature effects and other effects of a like nature which are experienced in any analog system. Further, it is difficult, if not impractical, to design an analog pulse compression system which may be programmed to use any more than a single predetermined pulse code.

SUMMARY OF THE INVENTION

Therefore, it is a primary object of this invention to provide an improved pulse compression radar system adapted to operate with any one of a relatively large number of pulse codes.

Another object of this invention is to provide a pulse compression system wherein analog echo signals are converted to digital signals for processing, thereby allowing the required matched filtering to be accomplished using digital computing techniques.

These and other objects of this invention are attained generally by providing a digital pulse coder in the form of a read only memory which may be programmed and clocked at any desired repetition frequency to produce, in digital form, the desired pulse coding for transmission, means operative simultaneously for converting the signal from the read only memory into a modulating signal for transmission on a radio frequency carrier and into the complex conjugate spectrum of such signal for comparison with digital signals representative of echo signals received from illuminated targets, means for converting each one of such echo signals from analog form to a digital form corresponding to the form of the signal out of the read only memory, means for cross correlating the signal out of the read only memory with such digital representation of each of the echo signals and, finally, means for minimizing spurious results from the cross correlation and converting the compensated results to compressed pulse signals, each one of such pulse signals being indicative of an echo signal.

BRIEF DESCRIPTION OF THE DRAWING

For a more complete understanding of this invention, reference is now made to the following description of a preferred embodiment illustrated in the accompanying drawings in which:

FIGS. 1A, 1B and 1C, taken together, make up a block diagram showing the organization of a pulse compression radar system according to this invention.

DESCRIPTION OF THE PREFERRED EMBODIMENT

Figure 1A:
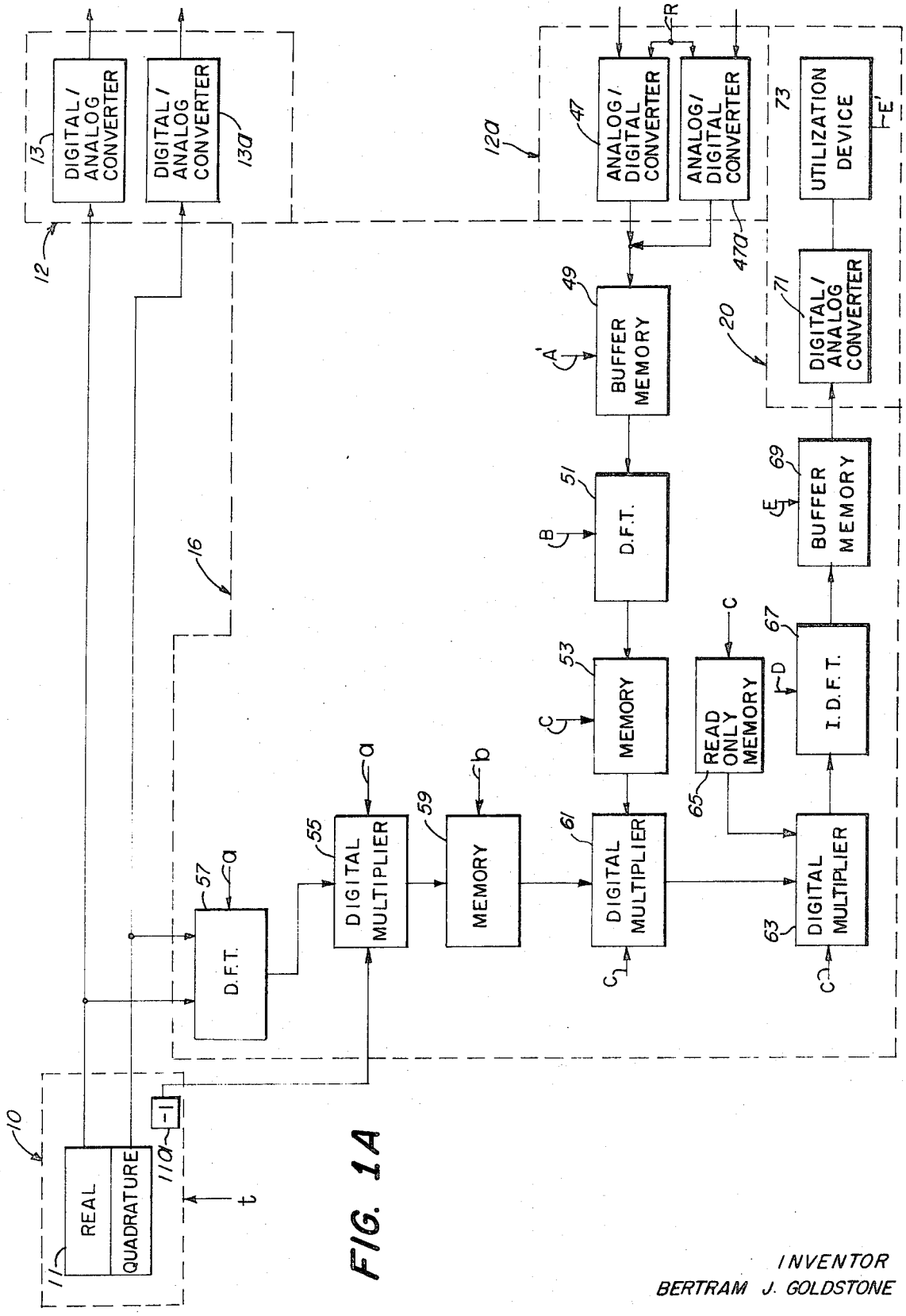

Referring now to the FIGURES, it may be seen that the elements of a radar system according to this invention may be conveniently divided in groups according to function. Thus, the illustrated system includes: A coding filter 10; signal form converters 12, 12a; a transmitter/receiver 14; a signal processor 16; a synchronizer 18; and a utilization section 20. Each of the foregoing groups will now be described in detail.

CODING FILTER 10

The coding filter 10 consists of a conventional read only memory 11 programmed to produce, in digital form, the real and quadrature, or imaginary, coefficients of the modulation signal desired for the transmitted waveform and "fill-in" signals to be referred to hereinafter. In addition, for convenience, the coding filter 10 also contains an auxiliary read only memory 11a programmed to produce a digital multiplier of $-1$ for each imaginary coefficient produced by the DFT 57. The read only memory 11 and the auxiliary read only memory 11a are actuated by gated block pulses, $t$, from the synchronizer 18. Such gated clock pulses are applied to the read only memory 11 for a period of time equal to the period of time during which targets are expected to be received. Suffice it to say here that such period is greater, by a factor of from 1 to 100, than the time taken to produce the real and imaginary coefficients of the modulation signal. The read only memory, therefore, is programmed to produce "fill-in" signals consisting of digital "zeroes" after the real and imaginary coefficients are produced.

SIGNAL FORM CONVERTER 12

The digital signals out of the coding filter 10 are passed, in the manner indicated, to a pair of digital to analog converters 13, 13a. These elements are conventional and identical. The exact construction of these elements may be varied as desired depending upon the format of the signals out of the coding filter 10. In any event, the output signal from each digital to analog converter 13, 13a is an analog signal, each such signal being the baseband signal representative of a quadrature component of the desired modulation signal. It is noted here that the "fill-in" signals, being digital zeroes, are converted to DC signals which have no effect on the transmitter now to be described.

TRANSMITTER/RECEIVER 14

The quadrature components of the desired modulation signal are combined and impressed on a carrier signal in a single sideband generator after passing through harmonic suppression filters 15, 15a. Thus, the signal out of harmonic suppression filter 15 is mixed with the output signal of an IF oscillator 17, (after the latter output signal is passed through a 90° phase shifter 19), in a balanced mixer. Similarly, the output signal of harmonic suppression filter 15a is mixed with the output signal of the IF amplifier 17 in balanced mixer 21a. The resulting signals from mixer 21 and mixer 21a are mixed in a balanced mixer 23. The signal out of balanced mixer 23 is then impressed, by means of an RF mixer 25, on the output signal of a stable local oscillator, Stalo 27, to produce a low power modulated RF signal. The latter signal is passed through an RF amplifier 29 (which is pulsed by way of a pulse modulator 31 in synchronism with the transmit gate, T) via a T/R switch 33 to a directional antenna.

Energy reflected from targets (not shown) illuminated by the modulated RF energy transmitted from the directional antenna 35 passes therethrough to the T/R switch 33 to a mixer 37. The second input to mixer 37 is the output signal from the Stalo 27. It follows, therefore, that the carrier frequency of the difference signal from the mixer 37 is the same as the frequency from the IF oscillator 17, modulated in the same way as the transmitted RF signal and including any Doppler shift due to target motion. Such IF signal then is passed through a conventional IF amplifier 39 and a quadrature detector 41, one input to the latter being shifted in phase by 90° in a 90° phase shifter 43. Quadrature phase detector 41 preferably is made up of a pair of balanced mixers (not shown) similar to balanced mixers 21, 21a. The outputs of the quadrature detector 41, which are baseband signals, are passed through low pass filters 45, 45a.

SIGNAL FORM CONVERTER 12a

The signal form converter 12a consists of analog to digital converters 47, 47a, each of which is actuated during the first receive gate interval, A, FIG. 1A) to sample the analog signal from one of the low pass filters 45, 45a and convert such samples back into the same digital format as the format of the signals out of the coding filter 10. Such converted signals are then passed to a buffer memory 49, which may be a shift register responsive to clock pulses during the first receive gate, A. The signals stored in the buffer memory 49 are then passed to a discrete Fourier transform, DFT 51, actuated during the second receive gate, B. The DFT 51 may, for example, be circuitry of the type disclosed in U.S. Pat. No. 3,517,173 issued to M. J. Gilmartin, Jr. et al. and entitled "Digital Processor For Performing Fast Fourier Transforms." The resulting signals, which taken together represent the frequency content of the baseband signals out of the low pass filters 45, 45a, are then passed to a memory 53 during the period C (FIG. 1A). The memory 53 also is a shift register. The result is that, during the interval C each digitalized element of the discrete Fourier transform of each received signal is stored in memory C.

Referring back now to the coding filter 10, it will be remembered that the auxiliary read only memory 11a produced a −1. This repetitively generated signal is fed as the multiplier for a digital multiplier 55. The multiplicand for the latter is, as shown, the transformed imaginary portion of the signal out of the read only memory 11 during the interval, $t$, after transformation thereof in discrete Fourier transform, DFT 57. The signal into memory 59 is, therefore, the complex conjugate of the frequency spectrum of the signal out of read only memory 11. DFT 57 and memory 59 are respectively the same as DFT 51 and memory 53.

The signal in the memory 59 and the signal in the memory 53 are multiplied in a digital multiplier 61. The resulting signal will be recognized as the frequency spectrum of a matched filter, plus range (or time) sidelobes. It is desirable, of course, that such sidelobes be reduced along with any other spurious responses. For this reason the signal out of digital multiplier 61 is fed into a weighting circuit, here consisting of a digital multiplier 63 and a read only memory 65. The latter is programmed in any known way to produce multiplying factors which, when combined with the signal out of digital multiplier 61, reduce such sidelobes and spurious responses. To complete the processing, the signal out of the digital multiplier 63 is fed to an inverse discrete Fourier transform (IDFT 67) and to a buffer memory 69. IDFT 67 is structurally the same as DFT 51, the only difference being that the sign of each weighting factor in IDFT 67 is reversed from each corresponding weighting factor in DFT 51. The signal out of IDFT 67, then, is a compressed pulse for each one of the echo signals received during each first receive gate (FIG. 1A), the time of occurrence of each such pulse being indicative of the range of each target.

UTILIZATION SECTION 20

The compressed pulses out of the buffer memory 69 may be fed through a digital to analog converter 71 to a utilization device 73 which may, for example, be a conventional detector and plan position indicator.

SYNCHRONIZER 18

Figure 1C:
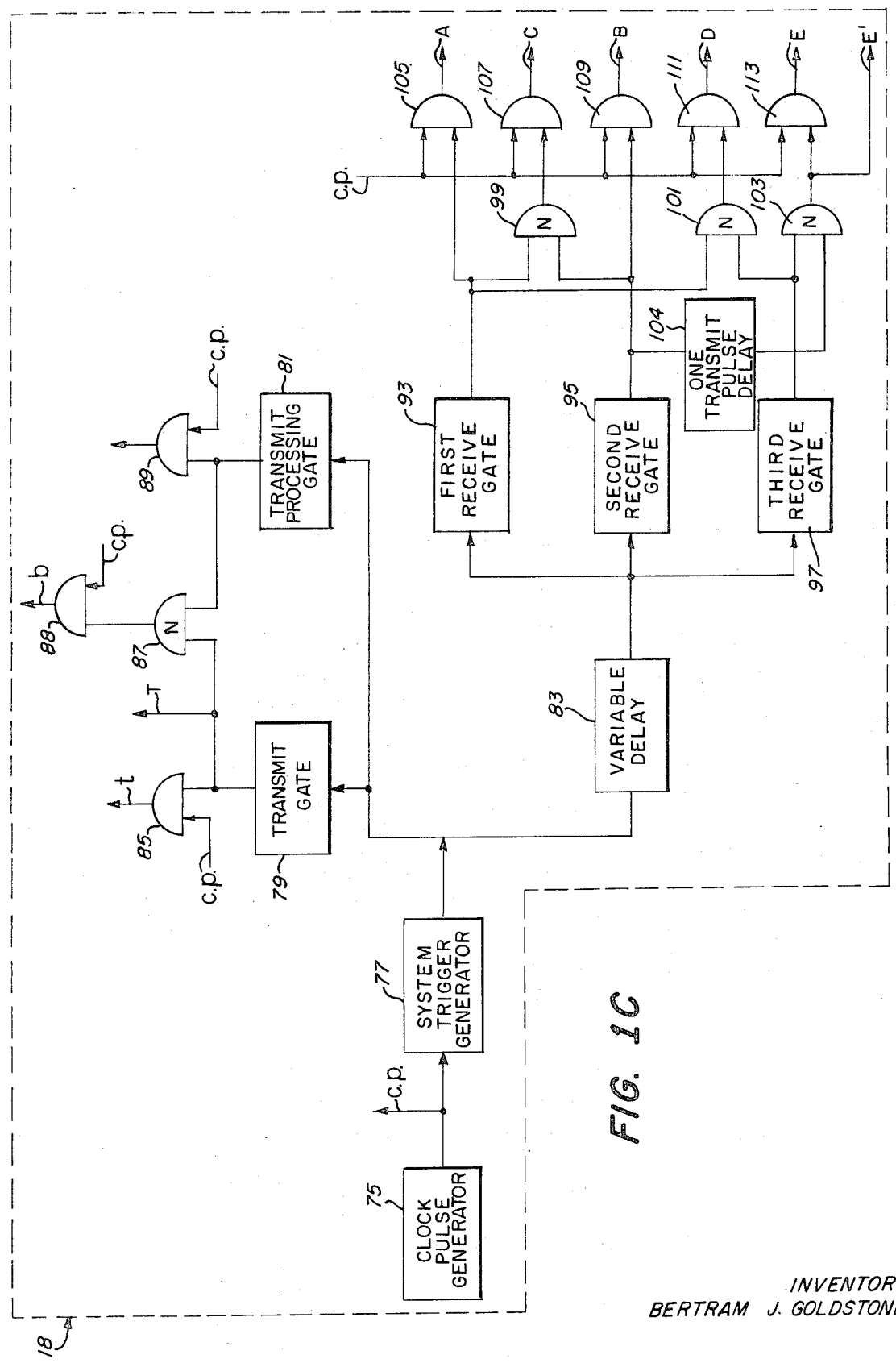

The synchronizer 18 performs the necessary function of providing control signals to the various elements of the disclosed system to cause each element to operate in a proper sequence. Thus, a clock pulse generator 75 of conventional construction produces clock pulses at a constant rate, the particular rate being chosen in accordance with the sampling rate desired for the system. Such clock pulses are counted down in a conventional system trigger generator 77 to produce system triggers at the desired pulse repetition frequency. The system triggers are fed into a transmit gate 79, a transmit processing gate 81 and a variable delay 83. Transmit gate 79, which is of conventional construction, is enabled for a period which preferably is between 1 and 100 times as long as the length of the transmitted pulse. The output, T, of the transmit gate 79 is connected to the pulse modulator 31 (FIG. 1A) and to AND gate 85 and to NAND gate 87 as shown. The former permits gated clock pulses, $t$, to be passed to the coding filter 10 and the digital multiplier 55 (FIG. 1A) when the read only memory 11, the auxiliary read only memory 11a and the digital multiplier 55 are to be operated. The output of the transmit processing gate 81 is fed to AND gate 89 and to the second terminal of NAND gate 87 as shown. The length of the transmit processing gate 81 is preferably twice the length of the transmit gate 79. It follows, then, that gated clock pulses, $a$, are passed to DFT 57 (FIG. 1A) during the time the coding filter 10 is actuated and for an equal period thereafter to permit DFT 57 to complete operation. NAND gate 87 is enabled during the last half of the period in which AND gate 89 is enabled. Therefore, gated clock pulses, $b$, are passed to the memory 59 (FIG. 1), via an AND gate 88, during the period in which DFT 57 produces the complex conjugate signal.

The variable delay 83, which may be actuated in any convenient manner to select a particular range interval in the range sweep of the system, triggers a first receive gate 93, a second receive gate 95 and a third receive gate 97. The first receive gate 93 is enabled for a period equal to the enabled period of the transmit gate 79 plus the length of time required for read only memory 11 to produce the coded signal for transmission; the second receive gate 95 is enabled for a period equal to twice the period of the first receive gate 93; and, the third receive gate 97 is enabled for a period equal to four times the period of the first receive gate 93. The three receive gates, in turn, are connected, through a decoding network made up of: NAND gates 99, 101, 103; AND gates 105, 107, 109, 111 and 113; and, a delay circuit 104 to pass gated clock pulses A, B, C, D and E to the elements indicated in FIG. 1 when a selected range interval is being examined for echo signals and any such echo signals are being processed. In this connection it will be noted that delay circuit 104, which has a delay equal to the length of one transmitted pulse, has the effect of inhibiting operation of buffer memory 69 and utilization device for one transmitted pulse period, i.e., during the period in which spurious signals exist.

It will be apparent to those of skill in the art that various elements shown in the figures need not be duplicated but rather, because some identical elements operate at different times during the transmission of signals and processing of echo signals, appropriate switching means may be used if desired. For example, switching may be incorporated to switch DFT 57 from its illustrated position to the position occupied in the circuit by DFT 51 between transmitted signals. It is felt, therefore, that this invention should not be restricted to its illustrated embodiment but rather should be limited only by the spirit and scope of the appended claims.

What is claimed is:

1. A pulse compression radar system for producing, from each echo signal corresponding to a target illuminated by a relatively long time-varying coded pulse of electromagnetic energy transmitted from such system, a relatively short time-varying response signal at a time corresponding to the range of each such target, such system comprising:

a. a clock pulse generator for producing a continuous train of clock pulses;

b. synchronizer means, responsive to the continuous train of clock pulses, for producing synchronizing signals and for producing groups of gated clock pulses during selected periods of time;

c. a coding filter, responsive to each successive clock pulse in a first group of gated clock pulses, for producing like groups of first and second digital numbers, the first portion of each one of such groups consisting of time-varying digital numbers indicative, respectively, of the real and the imaginary components of the modulation of the electromagnetic energy to be transmitted and the remainder of each one of such groups consisting of time-invariant digital numbers;

d. a transmitter/receiver, responsive to the first and the second time-varying digital numbers and to a first synchronizing signal, for converting such numbers into a relatively long time-varying coded pulse of electromagnetic energy to be transmitted and for demodulating each echo signal resulting therefrom to derive groups of third and fourth time-varying digital numbers indicative, respectively, of the real and imaginary components of each echo signal received during a selected period of time, such period being longer, by a period equal to the period required to produce the like groups of first and second digital numbers, than the period of time taken to produce the first group of gated clock pulses;

e. Fourier transform means, responsive to each clock pulse in a second and a third group of gated clock pulses, for producing the complex conjugate of the frequency spectrum represented by the like groups of first and second digital numbers and the frequency spectrum represented by the groups of third and the fourth time-varying digital numbers;

f. correlation means, responsive to the output signals from the Fourier transform means and to each clock pulse in the third group of gated clock pulses, for producing digital numbers representing the frequency spectrum of the relatively short time-varying response signal corresponding to each echo signal and the frequency spectrum, differing from the frequency spectrum of such response signal of spurious signals;

g. inverse Fourier transform means, responsive to the output signals from the correlation means and to each clock pulse in a fourth group of gated clock pulses, for producing a relatively short time-varying response signal at a time indicative of the range of each target and spurious signals at a time indicative of a shorter range; and, h. gating means responsive to a second synchronizing signal, for inhibiting such spurious signals.

2. A pulse compression radar system as in claim 1 wherein the coding filter includes a read only memory, such memory being programmed to produce any one of a plurality of different groups of digital numbers, the first portion of each one of such groups corresponding to a different modulation of the electromagnetic energy to be transmitted.

3. A pulse compression radar system as in claim 2 wherein the correlation means includes weighting means for selectively reducing the frequency spectrum of the spurious signals.

4. A pulse compression radar system as in claim 3 having, additionally, means for converting the signals out of the gating means to analog signals.

* * * * *